United States Patent [19]

Cummings

[11] 3,948,329
[45] Apr. 6, 1976

[54] APPARATUS FOR EFFECTING GROUND PENETRATION OF A GROUND ENGAGING MEMBER

[76] Inventor: Ernest W. Cummings, 140 Essex Drive, Concord, Tenn. 37720

[22] Filed: Jan. 24, 1974

[21] Appl. No.: 436,080

[52] U.S. Cl. .............. 173/49; 37/193; 37/DIG. 18; 61/72.6; 74/87; 172/40
[51] Int. Cl.² ......................................... H02G 9/00
[58] Field of Search .......... 299/14; 173/49; 61/72.6; 37/193, DIG. 18; 172/40; 259/DIG. 43; 74/87

[56] References Cited
UNITED STATES PATENTS

| | | | |
|---|---|---|---|
| 3,528,302 | 9/1970 | Kinnan................................. | 173/89 |
| 3,572,641 | 3/1971 | Peterson............................. | 74/87 X |
| 3,608,322 | 9/1971 | Kinnan et al. ..................... | 74/87 X |
| 3,618,237 | 11/1971 | Davis............................ | 37/DIG. 18 |
| 3,656,419 | 4/1972 | Boone.................................. | 74/87 |

FOREIGN PATENTS OR APPLICATIONS

| | | | |
|---|---|---|---|
| 1,096,663 | 12/1967 | United Kingdom........... | 259/DIG. 42 |
| 1,483,413 | 9/1969 | Germany.............................. | 74/87 |

Primary Examiner—Frank L. Abbott
Assistant Examiner—William F. Pate, III

[57] ABSTRACT

An apparatus for facilitating penetration of a ground engaging member, such as a plowshare or fence post, into the ground is disclosed which employs a vibrator having a rotatable mass eccentrically mounted to provide a cyclical motion to the member being caused to penetrate the ground. The apparatus is adapted to independently vary the amplitude and frequency of the cyclical motion imparted to the ground engaging member to adjust for varying soil conditions. One embodiment employs a pair of interconnected balanced vibrators which produce a resultant force acting generally along the longitudinal axis of the ground engaging member.

7 Claims, 9 Drawing Figures

APPARATUS FOR EFFECTING GROUND PENETRATION OF A GROUND ENGAGING MEMBER

The present invention relates generally to earth penetrating apparatus and more particularly to such apparatus employing novel means to effect penetration of a ground engaging member wherein the amplitude and frequency of an output force may be selectively independently varied to accommodate changes in soil conditions and the like.

It is generally known to employ vibratory means in connection with earth penetrating devices, such as in cable laying machines and the like, to facilitate initial penetration of a plowshare or plowblade into the ground whereafter a support vehicle is driven in a direction to effect movement of the plowshare generally transverse to its longitudinal axis. As the ground penetrating member is moved in a direction generally transverse to its longitudinal axis while being vibrated in the direction of its longitudinal axis, a cable or the like may be fed down along the rearward edge of the plowshare and laid into the ground without need for extensive trenching.

During such cable laying operations, and additionally when driving ground penetrating posts and the like into the ground, various soil conditions are encountered which substantially alter the rate at which the ground engaging member may be drawn through the soil or driven longitudinally into the soil. In the prior art ground penetrating devices, the vibratory action imparted to the ground penetrating member was less than satisfactory in that the components of vibration imparted to the device could not be varied with changing soil conditions. In addition, the "fixed" vibrations acted substantially parallel to the longitudinal axis of the ground penetrating member. Usually this axis was oriented generally vertically. It has been found by the present inventor that a complex cyclic motion imparted to the ground engaging member provides enhanced penetration by the ground engaging member when the amplitude and frequency of the motion are independently controlled. The present invention provides an improved apparatus for imparting such complex cyclical movement to a ground engaging member and for independently controlling the amplitude and frequency of such motion.

For purposes of this disclosure, the term "penetration" is used to describe both vertical and horizontal movement of a ground engaging member unless otherwise stated or appears obvious in the context of its use. "Vibration" or "vibratory action" are terms used herein to describe a cyclical motion but neither term is intended to limit the motion to a particular axis or plane unless so stated or otherwise appears obvious in the context of their use.

Accordingly, one of the objects of the present invention is to provide apparatus for use in causing ground penetration of a ground engaging member.

It is another object to provide such an apparatus which imparts a complex cyclical motion to the ground engaging member. It is another object to provide such an apparatus which includes means for varying the amplitude and frequencny of the force applied to the ground engaging member to facilitate a substantially improved rate of penetration irrespective of varying soil conditions.

Another object of the present invention is to provide apparatus for use in effecting penetration of a ground engaging member into the ground wherein a rotational mass is eccentrically mounted relative to an axis of rotation, the eccentricity of the mass being selectively variable during operation to vary the amplitude of a force applied to the member.

Still another object of the present invention is to provide vibratory apparatus for use in effecting earth penetration of a ground engaging implement wherein a pair of vibrators are interconnected in balanced relation so that forces created by variable eccentric masses nullify each other except for a resultant force which acts generally along the longitudinal axis of the implement.

Further objects and advantages of the present invention, together with the organization and manner of operation thereof, will become apparent from the following detailed description of the invention when taken in conjunction with the accompanying drawings wherein like reference numerals designate like elements throughout the several views and wherein:

Figure 1:
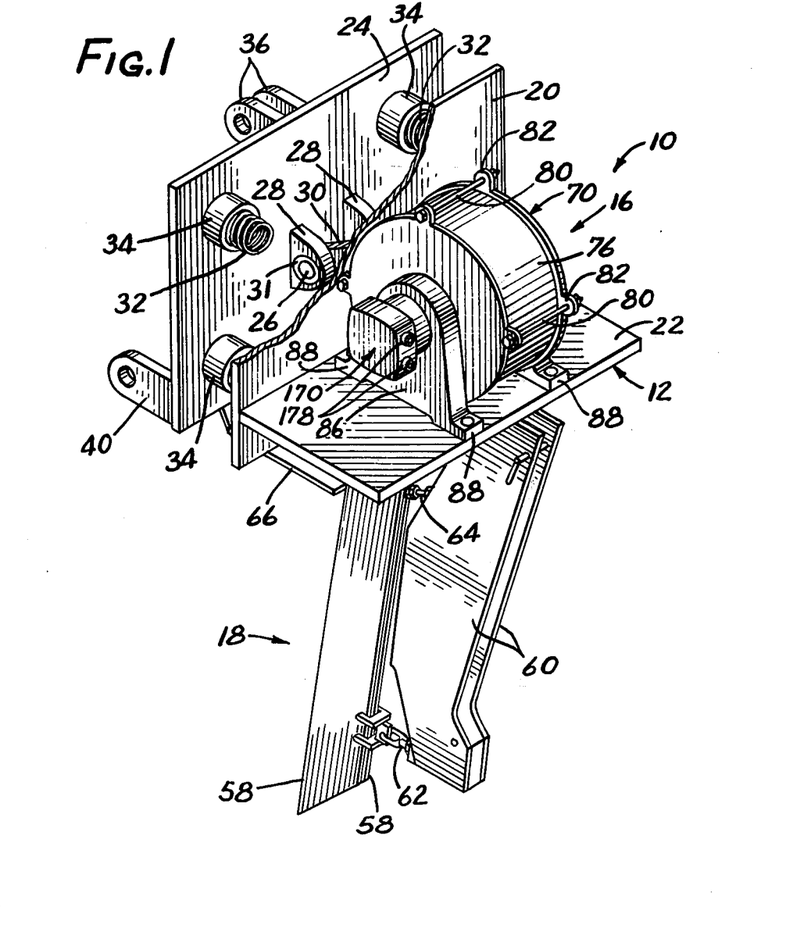
FIG. 1 is a perspective view illustrating an apparatus for use in laying cable and the like, which apparatus employs a vibrator in accordance with the present invention.
Figures 1A, 1B:
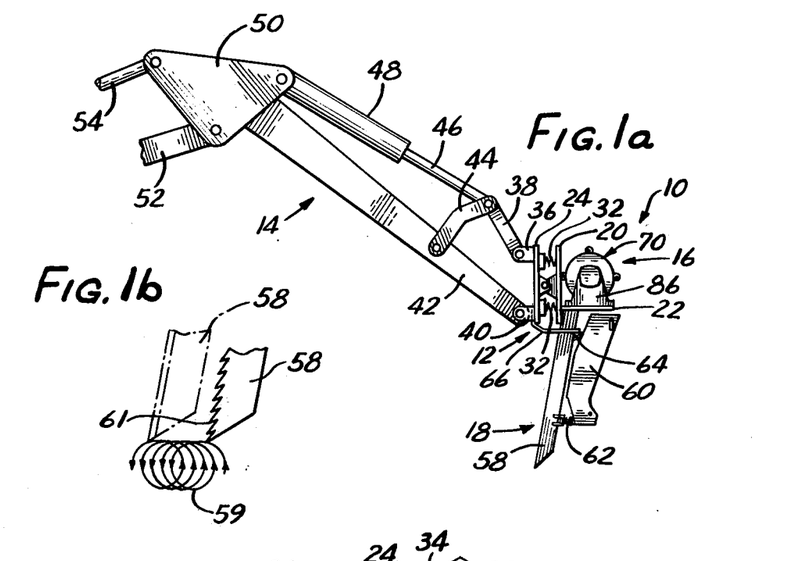
FIG. 1a is a partial elevational view illustrating the apparatus of FIG. 1 mounted on the rear of a backhoe assembly to facilitate raising and lowering of the apparatus and move it along a generally horizontal path.
FIG. 1b is an enlarged view illustrating generally the path of travel of the forward cutting edges and lower tips of the ground penetrating trench forming blades of the cable laying apparatus of FIG. 1.

Referring now to the drawings, and in particular to FIGS. 1 and 1a, an apparatus or mechanism in accordance with one embodiment of the present invention for effecting penetration of an earth engaging member or implement is indicated generally at 10. The apparatus 10 includes frame support means, indicated generally at 12, which is adapted to be mounted on a movable carriage or chassis such as a tractor or the like (not shown). The frame support means 12 may be mounted on the movable chassis by means of a three-point hitch as employed on a conventional backhoe assembly, indicated generally at 14. The apparatus 10 includes vibrator means, indicated generally at 16, mounted on the frame support means 12 and adapted in operation to facilitate penetration of a ground engaging member or implement, indicated generally at 18, supported in depending relation from the frame support means 12.

The frame support means 12 includes a pair of plate members 20 and 22, the plate member 22 being fixedly secured to the plate 20 in normal relation thereto. The plate member 20 is pivotally mounted generally adjacent its center to a support plate 24 through a pivot shaft 26 received through outwardly projecting support brackets 28 on the support plate 24 and a rearwardly projecting support bracket 30 secured to the surface of the plate member 20 opposite the plate member 22. A sleeve bushing 31, made from a resilient material such as a relatively hard rubber, is disposed about the pivot shaft 26 between the pivot shaft and the support brackets 28 and 30 to allow translational movement of the plate member 20 relative to the support plate 24 in addition to pivotal movement. Four coil compression springs 32 are supported in annular support collars 34 secured to the support plate 24 such that the outer ends of the springs 32 engage the opposing surface of the plate member 20 adjacent the four corners thereof and urge the plate member 20 to a position generally parallel to the support plate 24.

The support plate 24 has a pair of parallel spaced support arms 36 projecting from its rearward surface generally adjacent the upper edge thereof for pivotal connection to one end of a toggle arm 38 of the backhoe assembly 14. The support plate 24 has support arms projecting rearwardly from the opposite lower corners thereof, one of which is shown at 40, for pivotal connection to a working arm 42 of the backhoe assembly 14. The end of the toggle arm 38 opposite its pivotal connection to the support arms 36 is pivotally connected to both a second toggle arm 44 and the outer end of the piston 46 of a pneumatic or hydraulic actuating cylinder 48. The cylinder 48 is pivotally supported by a generally triangularly shaped housing 50 which, in turn, is pivotally mounted on the outer end of a boom, indicated partially at 52, for pivotable movement by means of an actuating piston 54. The backhoe assembly 14 is mounted by means of the boom 52 and the actuating piston 54 to a movable chassis or tractor (not shown) and is operable in a known manner to raise and lower the frame support means 12 relative to the ground and maintain the support plate 24 in a generally vertical plane so as to dispose the plate member 22 in a horizontal position. It will be understood that the frame support means 24 may be supported on any type of support structure operable to raise and lower the frame support means 24 relative to the ground surface, the backhoe assembly being but one of such available structures. From the foregoing description it will be understood that the plate member 20 is capable of rotational movement about the axis of the shaft 26, such rotational movement being limited by the springs 32. Further, the plate 20 is capable of limited translational movement relative to the support plate 24 by reason of the resiliency of the hard rubber sleeve bushing 31 disposed about the shaft 26 so that the ground-engaging implement 18 undergoes complex cyclic movement when subjected to the forces developed by a rotating eccentric mounted on plate 22 as will appear more fully hereinafter.

The ground engaging implement 18 of the apparatus 10 illustrated in FIGS. 1 and 1a may comprise means for penetrating the ground and forming a narrow width trench or opening in the ground of sufficient depth to lay a cable in the ground without having to trench the ground in a conventional manner. To this end, the ground engaging implement 18 may comprise a plow blade having relatively closely spaced parallel blade member 58 generally pointed on their lower ends and fixedly secured at their upper ends to the lower surface of the plate member 22. The blade members 58 when subjected to a vibratory force from the vibrator means 16 are adapted to penetrate a ground surface and facilitate movement of the blades in a direction generally transverse to their longitudinal axes by movement of the tractor or movable chassis (not shown) upon which the backhoe assembly 14 is mounted. The path of movement of the lower tips of the blade members 58, when caused to oscillate under the influence of the vibrator means 16 and when moved in a direction generally transverse to their longitudinal axes by movement of the associated movable chassis, is indicated generally in FIG. 1b by the line 59. The path 59 is generally defined by a point which would generate a generally circular or elliptical path, in the direction of the arrows, except that the circular or elliptical path is not allowed to form a closed path because the point is moved in a horizontal direction as it moves along an imaginary center. In this manner, a "nibbling" cutting action is achieved for the blades 58. If desired, the forward cutting edges of the blade members 58 may be provided with teeth-like serrations, as indicated at 61 in FIG. 1b, to facilitate cutting.

Pivotally attached along the trailing edges of the blade members 58 is a pair of spaced generally vertically disposed cable shoes 60 adapted to receive a cable (not shown) downwardly therebetween and guide the cable into the trench formed by the blade members 58 whereby to lay the cable generally horizontally within the trench in a known manner. The cable may be supplied from a cable supply reel (not shown) carried by the movable chassis or tractor to which the backhoe assembly 14 is attached, the cable being fed downwardly between the cable shoes 60. The cable shoes 60 are connected to the trailing edges of the blade members 58 through suitable pivot or clevis linkages 62 and 64. A ground engaging shoe plate 66 is secured to the support plage 24 and extends rearwardly in underlying relation to the plate member 22 for engagement with the ground surface to limit the extent of downward penetration of the implement 18 into the ground during operation.

Figure 2:
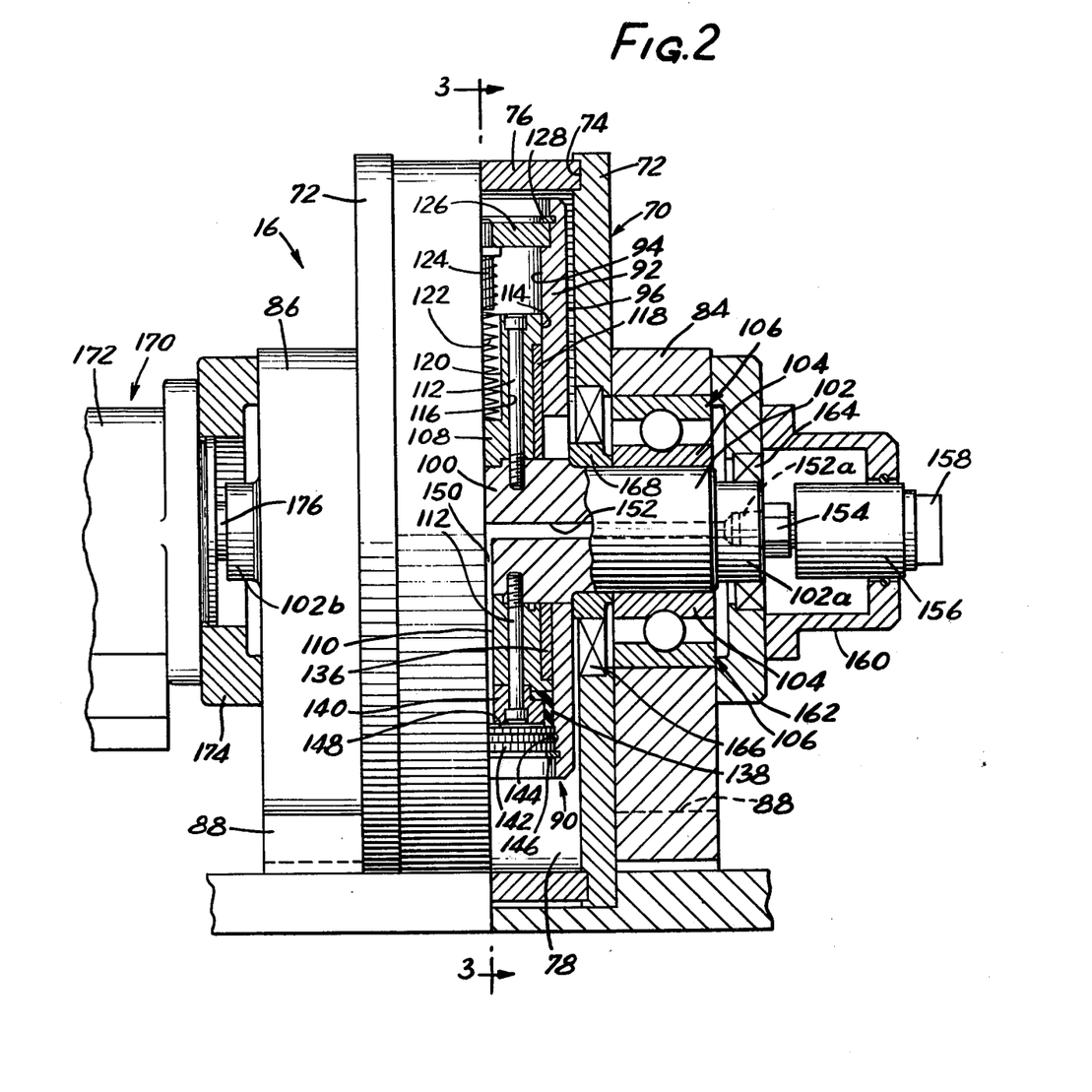
FIG. 2 is an enlarged front elevational view, taken partially in vertical longitudinal section, of the vibrator employed in conjunction with the apparatus shown in FIG. 1.
Figure 3:
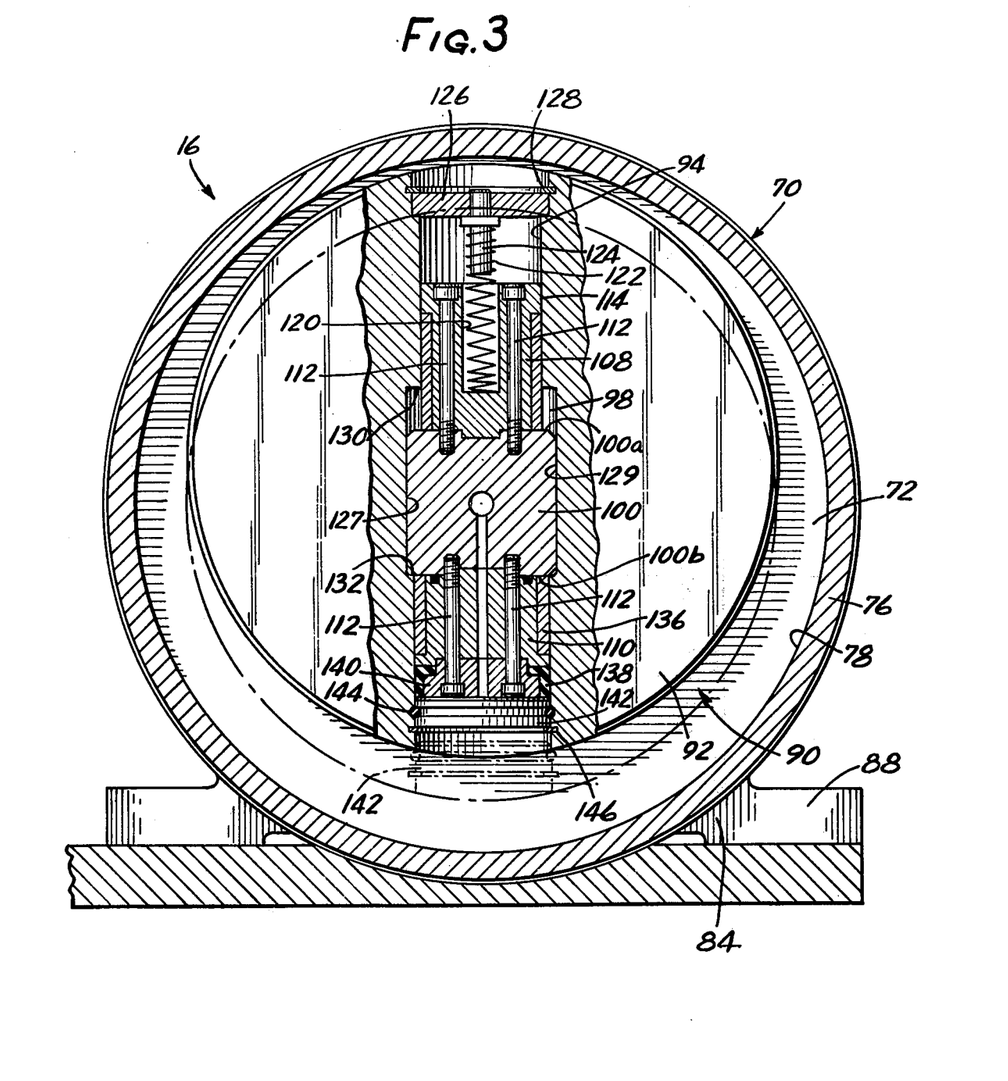
FIG. 3 is a partial transverse sectional view taken substantially along the line 3—3 of FIG. 2.

Referring now to FIGS. 2 and 3, taken in conjunction with FIG. 1, the vibrator means 16 includes housing means, indicated generally at 70, which includes a pair of parallel, spaced, generally circular end plates 72 each of which has an annular recess 74 adjacent the peripheral edge thereof to receive a peripheral edge surface of an annular wall 76 to define a substantially closed circular chamber 78 between the side plates 72 and the annular wall 76. The end plates 72 may be secured together through any suitable means such as tie bolts 80, four of which are shown in FIG. 1, equidistantly spaced about the end plates 72 and received through radially projecting ears 82 formed on the end plates.

A pair of mounting plates 84 and 86 of substantially identical configuration are secured by suitable means, such as welding or the like, to the outer planar surfaces of the end plates 72. The mounting plates 84 and 86 each have a pair of mounting pads 88 formed thereon which provide means for securing the housing means 70 to the upper surface of the plate member 22 of the frame support means 12 through mounting bolts or the like.

The housing means 70 serves to support mass means, indicated generally at 90, within the chamber 78 for rotational movement relative to the housing means 70. The mass means 90 includes a circular mass member 92 preferably made from a metallic material of relatively high specific weight. The mass member 92 has a diametrically disposed generally cylindrical bore 94 therethrough which is equidistantly spaced between outer planar parallel side surfaces 96 of the mass member. The bore 94 intersects a generally axially disposed through-bore 98 having a rectangular cross-sectional configuration, as considered in FIG. 3. The rectangular shaped axial bore 98 has its geometric center offset from the true center of the circular mass member 92 for a reason which will become more apparent hereinbelow. The bore 98 receives a generally square cross sectional shaped portion 100 of a drive shaft 102 therethrough, the drive shafts 102 having opposite cylindrical end portions supported within inner races 104 of antifriction ball bearings, indicated generally at 106. The outer races of the bearings 106 are secured, respectively, within suitable bores in the mounting plates 84 and 86 so as to support the drive shaft 102 for rotational movement about its longitudinal axis relative to the housing means 70.

The central squared cross sectional portion 100 of the drive shaft 102 has a pair of diametrically opposed guide members 108 and 110 secured thereon by means of bolts 112. The guide member 108 has a cylindrical periperhal guide surface 114 thereon which slidingly engages the peeripheral surface of the bore 94, and has a recessed peripheral surface 116 which receives an annular brass sleeve bearing 118 the outer peripheral surface of which is adapted for sliding contact with the bore 94. The guide member 108 has a counterbore 120 therein which receives one end of a coil compression spring 122 the opposite end of which is received over a guide pin 124 secured within a circular disc 126. The disc 126 is within the bore 94 against a radial shoulder surface thereof by means of an annular retaining ring 128.

As noted, the bore 98 in the mass member 92 is generally rectangular in cross sectional configuration, the bore 98 having opposed peripheral side surfaces 127 and 129 which slidingly engage opposite periperal planar side surfaces of the squared portion 100 of the drive shaft 102. The rectangular bore 98 further has end surfaces 130 and 132 which allow radial movement of the mass member 92 relative to the drive shaft 102. The end surface 130 of the bore 98 is positioned such that when in engagement with a surface 100a of the squared portion 100 of the drive shaft 102, the longitudinal axis of the drive shaft 102 coincides with the center axis of the mass member 92. When the mass member 92 is moved to a position wherein the surface 132 of the bore 98 engages a surface 100b on the square central portion 100 of the drive shaft 102, the axis of the circular mass member 92 is eccentrically diposed relative to the axis of the drive shaft 102. The compression spring 122 is selected so as to urge the mass member 92 to its maximum eccentric position relative to the axis of the drive shaft 102 wherein the surface 102b of the squared center section 100 of the drive shaft abuts the end surface 132 of the bore 98. It will be understood that the inner diameter of the annular wall 76 defining the chamber 78 is sufficient to provide clearance for rotation of the mass member 92 when the mass member is in its position of maximum eccentricity.

The guide member 110 supports a brass sleeve bearing 136 which slidingly engages the interior surface of the bore 94. An annular seal 138 is secured between the outer end of the guide member 110 and a seal retaining member 140 by means of the heads of the bolts 112 which pass through both the seal retaining member 140 and the guide member 110.

A circular piston 142 is fixedly retained within the bore 94 radially outwardly from the seal retainer 140 by means of an annular sealing ring 144 which sealingly interconnects the piston 142 with the inner surface of the bore 94 and by a circular retaining ring 146 disposed within a suitable peripheral groove in the bore 94. By reason of the piston 142 being fixedly and sealingly retained within the bore 94 of the mass member 92, fluid pressure may be introduced against a radially inward surface 148 of the piston member 142 to cause the mass member 92 to move transversely of the drive shaft 102 in a direction to reduce the eccentricity of the mass member relative to the axis of the drive shaft 102. To effect such introduction of fluid pressure against the surface 148 of the piston 142, a fluid passage is provided which includes a fluid flow path 150 formed axially through the guide member 110 and seal retaining member 140 and extending radially to the longitudinal axis of the shaft 102 whereafter the fluid path is directed axially of the drive shaft 102 in an axial path 152.

The axial flow passage 152 in the drive shaft 102 terminates at its outer end in an enlarged diameter portion 152a which is connected to the inward end 154 of a conventional rotary fluid coupling or union 156. The union 156 has an outer end portion 158 adapted for connection to a hydraulic or pneumatic pressure conduit, as shown schematically at 192 in FIG. 4, such that fluid under pressure may be introduced through the flow paths 152 and 150 against the surface 148 of the piston 142 and effect movement of the mass member 92 toward a position of zero eccentricity relative to the drive shaft 102. The rotary union 156 is mounted within a support housing 160 which is suitably secured to the mounting plate 84 by means of a collar 162. An annular seal 164 is supported by the collar 162 about the outer end 102a of the drive shaft 102. An annular seal 166 is supported between an axial opening in the end plate 72 and an annular collar 168 on the drive shaft 102, the seals 164 and 166 serving to prevent contamination of the associated bearing 106.

With the rotary union 156 being connected to a source of fluid pressure through suitable control valve means, to be described hereinafter, fluid under pressure may be introduced against the surface 148 of the piston 142 to selectively move the mass member 92 from a position of maximum eccentricity, as established by the compression spring 122, to a position of zero eccentricity relative to the drive shaft 102. The mass member 92 and the elements supported in the bore 94 therein are in balance when the mass member is in a position of zero geometrical eccentricity such that no vibratory force results during rotation when the member is disposed in its zero position. With the vibrator means 16 mounted on the frame support means 12 as hereinabove described, rotational movement of the drive shaft 102 with the mass means 92 thereon in an eccentric position relative to the drive shaft will effect a vibrational force transmitted through the housing means 70 to the frame support means 12 and thus to the ground engaging implement 18. To effect selected rotational movement of the drive shaft 102 and thus rotational movement of the mass means 92, the vibrator means 16 includes rotational drive means, indicated generally at 170, connected to an end 102b of the drive shaft 102 opposite the end 102a which is connected to the rotary union 156. The drive means 170 in the illustrated embodiment comprises a conventional hydraulic motor 72 supported by a mounting collar 174 which, in turn, is secured to the outer surface of the mounting plate 86 of the housing means 70. The hydraulic motor 172 has an output shaft 176 which is positively connected to the end 102b of the drive shaft 102 through a suitable spline or key-slot connection such that rotational movement of the motor drive shaft 176 will effect a corresponding rotational movement of the drive shaft 102.

Figures 4, 6, 7:
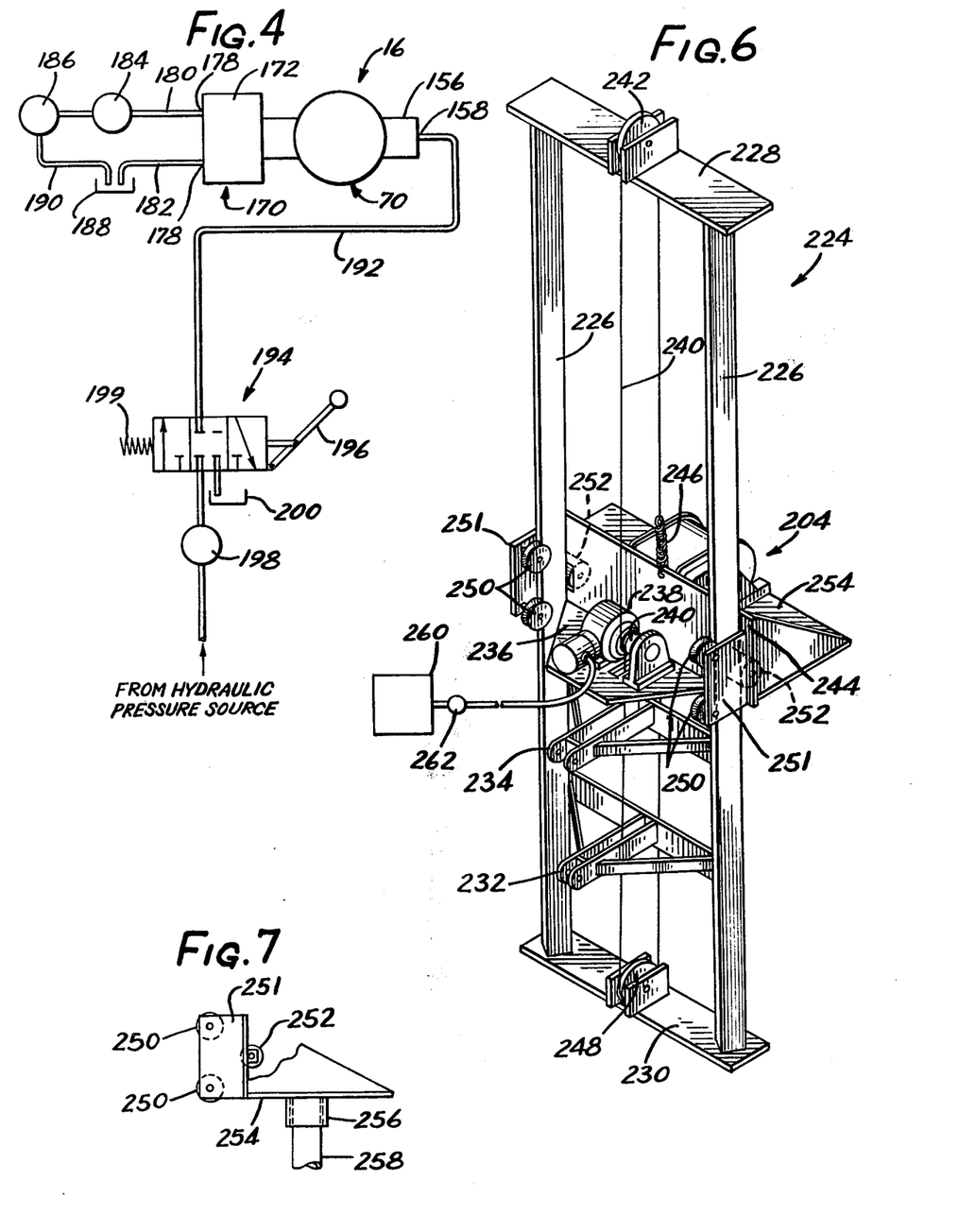
FIG. 4 is a schematic control circuit for use in varying the amplitude and frequency of the vibratory force effected with the vibrator in accordance with the present invention.
FIG. 6 is a perspective view illustrating the vibrator of FIG. 5 mounted on an apparatus which may be employed to drive posts and the like longitudinally into the ground.
FIG. 7 is a side elevational view of the means for engaging and guiding the upper end of a post when being driven into the ground by the apparatus of FIG. 6.

The hydraulic motor 172 has a pair of connector fittings 178 (FIG. 1) which are adapted for connection to hydraulic flow conduits as indicated at 180 and 182 in FIG. 4. The flow conduit 182 is connected through a conventional pressure compensated flow control valve 184 to a conventional fixed pressure variable displacement hydraulic pump 186. The hydraulic pump 186 is connected to a hydraulic reservoir 188 through a flow conduit 190, while the exhaust side of the hydraulic motor 172 is connected to the reservoir 188 through the flow conduit 182. The hydraulic pump 186 may be controlled either manually or automatically by conventional means (not shown) to control the rotational speed of the drive shaft 102 and thus the rotational speed of the mass member 92. It will be understood that roational driving of the drive shaft 102, and thus the mass member 92, may alternatively be effected by means of pneumatic or electric drive motors of known design.

The end 158 of the rotary union 156 is connected through the flow conduit 192, through a three-position directional control valve, indicated generally at 194 in FIG. 4, and through a conventional pressure reducing valve 198 to a source of hydraulic pressure. The control valve 194 includes a control handle 196 operable to connect the rotary union 156 to the source of hydraulic pressure to effect movement of the mass member 92 from its position of maximum eccentricity toward a positon of zero eccentricity. The control valve 194 is normally biased to a centered non-flow position by a spring 199 but is operable to connect the flow passage 105, 152 to the source of fluid pressure to null the eccentricity of the mass member 92 or connect the flow passage 150, 152 to a reservoir 200 to reduce the pressure acting against the piston 142 sufficiently to allow the compression spring 122 to move the mass member 92 toward an eccentric position relative to the axis of the drive shaft 102. Each time the valve spool of the control valve 194 is returned to its centered position, the mass member 92 is maintained in a "hold" position as established by the next preceeding movement of the control handle 196 to connect the flow passage 105, 152 to either the source of fluid pressure or the reservoir 200. The control handle 196 can then be operated to move the mass member 92 to a new hold position to vary the eccentricity and thus the vibrational output force.

It can be seen that the apparatus 10 thus described provides means to selectively and simultaneously vary the amplitude and frequency of the vibratory force acting on the blade members 58 of the ground engaging implement 18 through the vibrator means 16. The vibratory force resulting from rotational movement of the mass member 92 when disposed in a position eccentric to the axis of the drive shaft 192 will act on the blade members 58 in a manner to effect a vibrational oscillation thereof the magnitude and frequency of which may be selectively adjusted depending upon the condition of the ground being penetrated by the ground engaging means 18. For example, should the earth be firm or hard, a relatively small vibratory force at a high rotational speed of the mass member 92 may be desired, while under relatively soft ground conditions, a relatively large vibratory force at a substantially reduced frequency may be desired to effect optimum movements of the blade members 58. Since the net resultant vibratory force acts at all angles to the axis of rotation of the drive shaft 102, considered in a plane perpendicular to the axis of the shaft 102, and the plates 20 and 22 mounting the implement 18 have at least limited pivotal and translational freedoms the lower pointed ends or tips of the blade members 58 establish an overlapping elliptical or circular pattern as they are moved through the ground transversely of their longitudinal axes upon forward movement of the chassis or carriage upon which the apparatus 10 is mounted, as indicated generally by the aforedescribed path 59 in FIG. 1b.

Figure 5:
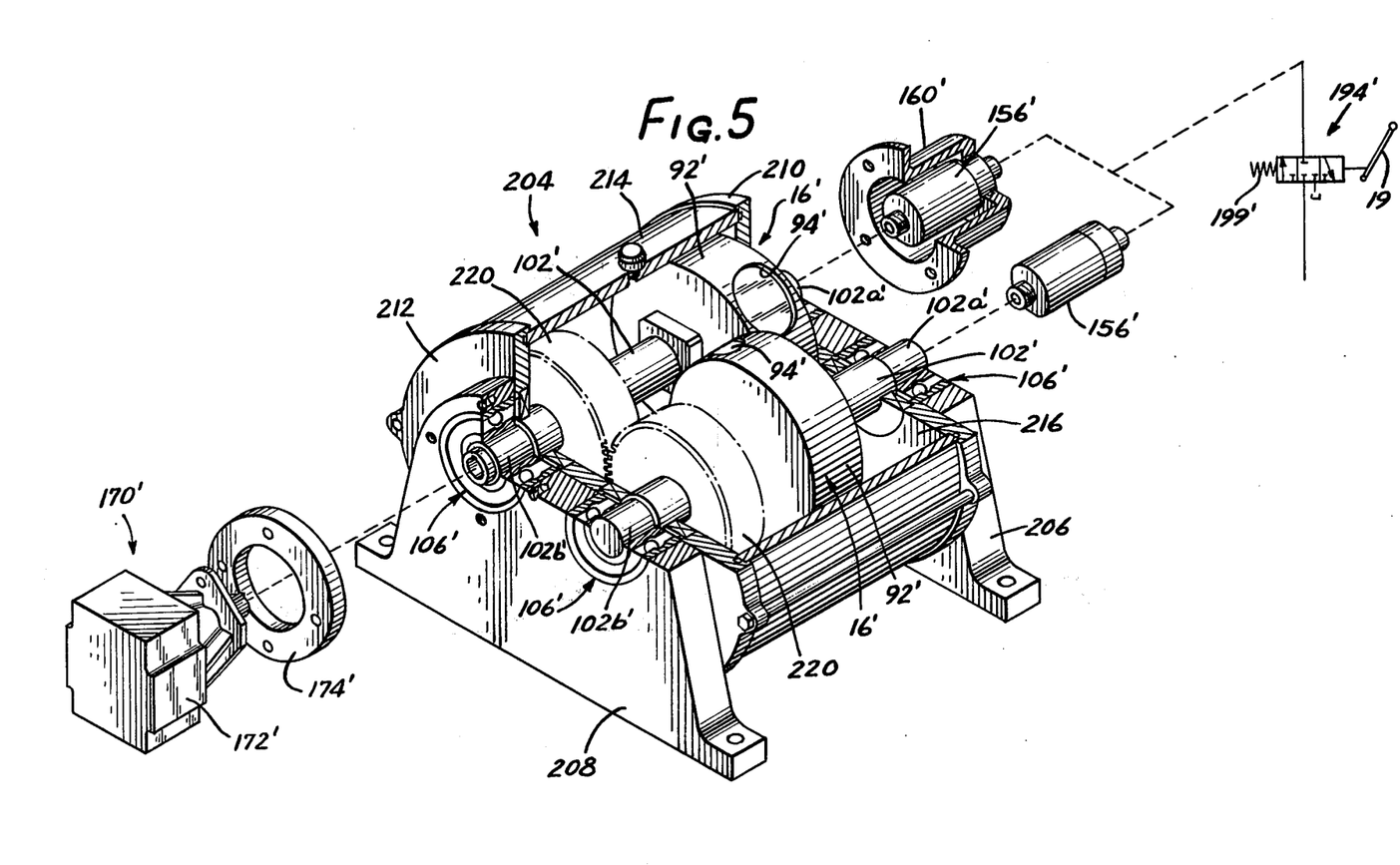
FIG. 5 is a perspective partially exploded view of a balanced vibrator mechanism in accordance with the present invention, portions being broken away for clarity.

FIG. 5 illustrates an alternative embodiment of vibrator means, indicated generally at 204, constructed in accordance with the present invention. In the vibrator means 204 illustrated in FIG. 5, reference numerals indicated with a prime superscript (') refer to elements which are similar to corresponding elements employed in the vibrator means 16 described hereinabove. The vibrator means 204 includes a pair of vibrator mass members 92' each of which is mounted on an elongated drive shaft 102' the ends 102a' and 102b' of which are mounted in suitable ball bearings 106' supported in mounting plates 206 and 208, respectively. The mounting plates 206 and 208 are secured to the outer surfaces of end plates 210 and 212, respectively, which have a housing wall 214 of generally oval cross sectional configuration secured to and between the end plates to provide a substantially closed housing chamber 216 in which the vibrator mass members 92' are disposed. A rotary fluid coupling or union 156' is connected to the end 102a' of each of the drive shafts 102' for connection to a source of hydraulic fluid (not shown) through a three-position flow control valve 194'. In the control connection illustrated in FIG. 5, the hydraulic pressure source is connected through the control valve 194' to both of the parallel spaced drive shafts 102' for effecting a simultaneous equal displacement of the mass members 92'. Each of the mass members 92' is biased to an eccentric position relative to its associated drive shaft 102' and is selectively movable to a zero or null eccentric position by means of the control valve 194' in a similar manner to the selective adjustability of the vibrator masses 92 of the vibrator means 16.

The drive shafts 102' supporting the vibrator mass members 16' within the housing chamber 216 are disposed in parallel spaced relation, with the vibrator mass members 16' being axially offset relative to each other so as to allow closer spacing of the shafts 102'. Each of the shafts 102' has a spur gear 220 fixedly secured thereon, the spur gears 220 being of equal size and disposed in intermeshing relation such that rotational driving movement of one of the drive shafts 102' will effect an equal rotational movement of the other drive shaft in an opposite rotational direction. Drive means comprising a hydraulic motor 170' is mounted on the support plate 208 to effect driving rotational movement of the left-hand drive shaft 102', as considered in FIG. 5, in similar fashion to the connection of the above described drive motor 170 to the drive shaft 102 of the vibrator means 16. The hydraulic drive motor 170' may be connected in a hydraulic control circuit such as illustrated in FIG. 4 to effect selective rotation of the drive means 170'.

With the vibrator mass members 92' being connected so as to rotate at identical rotational speeds in opposite rotational directions, upon driving rotation of one of the drive shafts 102', it will be appreciated that all of the vibratory forces resulting from the eccentrically disposed mass members 92' during their rotation will cancel each other except the vertical components of such vibratory forces. In this manner, the vibrator means 204 is a "balanced" vibrator. The resultant of the vertical forces created by the eccentric mass member 92' acts in a plane normal to the plane containing the longitudinal axis of the drive shafts 102'.

FIGS. 6 and 7 illustrate an apparatus, indicated generally at 224, which employs a vibrator means 204 to effect generally vertical downward longitudinal movement of a post or the like into a ground surface. The apparatus 224 is generally termed a post driver and includes a pair of vertically disposed parallel spaced V-shaped guide rails 226 connected at their upper and lower ends by cross plates 228 and 230, respectively. A pair of vertically spaced rearwardly directed support brackets 232 and 234 are secured to and between the guide rails 226 for connection to a suitable three-point hitch such as on a backhoe assembly means in similar fashion to the mounting of the above described apparatus 10 on the backhoe 14 as illustrated in FIG. 1a. A generally horizontally disposed support plate 236 is secured to and between the guide rails 226 and supports a hydraulic winch 238 having an output shaft 240 about which is disposed a control cable 240. The upper reach of the control cable 240 is reeved over an upper idler pulley 242 rotatably supported by the upper cross plate 228, with the end of the upper reach of cable 240 being secured to a vertically disposed mounting plate 244 through a spring member 246. The lower reach of the cable 240 is reeved around a lower idler pulley 248 rotatably supported by the lower cross plate 230, the end of the lower reach of cable 240 being thereafter passed upwardly for connection to the lower edge of the mounting plate 244 through a spring member (not shown) similar to the spring member 246.

The mounting plate 244 is slidable along the guide rails 226 through guide rollers 250 mounted on side plates 251 and having V-shaped peripheral grooves for cooperation with the rearward edges of the V-shaped rails 226, and through guide rollers 252 engaging the forward edges of the guide rails 226. In this manner, selective actuation of the hydraulic winch 236 will effect a vertical movement of the mounting plate 244 upwardly or downwardly along the guide rails 226. A generally horizontally disposed support plate 254 is secured to the forward surface of the mounting plate 244 in normal relation thereto and serves to support a vibrator means 204 of the type illustrated in FIG. 5.

By mounting the post driver apparatus 224 on a suitable movable carriage or the like and connecting the vibrator means 204 to sources of hydraulic pressure for varying the eccentricity and frequency of rotation of the mass members 92', an oscillating or vibratory movement may be imparted to the support plate 254. As seen in FIG. 7, the support plate 254 has a post receiving collar or cap 256 secured to its lower surface generally centrally thereof to receive and engage the upper end of a post, shown partially at 258, or the like having its lower end in engagement with the ground surface. As the plate 254, and thus the post 258, is caused to vibrate by the vibrator means 204, the hydraulic winch 238 is actuated by means of a source of hydraulic pressure 260 and control valve 262 to effect a controlled lowering of the support plate 254 and vibrator means 204 against the upper end of the post 258 to maintain continual contact with the upper end of the post and cause the post to penetrate the ground. The resultant downward driving force from the vibrator means 204 may be selectively varied in magnitude and frequency in accordance with the particular conditions of the ground into which the post is being driven. For example, should the ground conditions be relatively soft, a relatively high amplitude, low frequency vibratory force may be desired, while if the ground surface is relatively hard a high frequency, low amplitude vibratory force may be desired.

Thus, in accordance with the present invention, it can be seen that vibrator means are provided which may find ready application in apparatus for effecting penetration of an earth engaging member or implement into the ground. The vibrator means in accordance with the present invention are adapted to impart cyclical movement of ground engaging members. The vibrator means include means for selectively varying the eccentricity of the rotatable masses supported therein relative to their axes of rotation whereby to vary the amplitude of forces transmitted to the ground engaging members, with means being provided to vary the rotational speed of the eccentric masses so as to selectively and simultaneously vary the frequency of the forces applied to the ground engaging members. In this manner, a generally uniform movement of the ground penetrating member or implement into the ground may be maintained, and movement of the ground engaging member in a direction generally transverse to its longitudinal axis is greatly facilitated independent of ground conditions.

While preferred embodiments of the present invention have been illustrated and described, it will be obvious to those skilled in the art that changes and modifications may be made therein without departing from the invention in its broader aspects. Particular features of the invention are defined in the appended claims.

What is claimed is:

1. Apparatus for effecting penetration of a ground engaging member such as a plowshare or the like into the ground, said apparatus comprising, in combination, frame support means adapted for movement toward and away from the ground surface, a ground engaging member mounted on said frame means for movement therewith, and vibrator means supported by said frame means and adapted to impart a cyclical vibratory force to said ground engaging member, said vibrator means including housing means defining a substantially closed chamber therein, a rotatable drive shaft supported by said housing means and extending through said chamber, a mass member, means supporting said mass member on said drive shaft for rotation therewith about the axis of said drive shaft, and for radial movement with respect to the rotational axis of said shaft between positions of substantially zero eccentricity and maximum eccentricity means biasing said mass member toward a position of maximum eccentricity relative to its axis of rotation, and fluid pressure means including a variable volume fluid pressure chamber disposed within said mass member and means for introducing fluid pressure into said pressure chamber for selectively varying the eccentricity of said rotatable mass member relative to the axis of rotation of said shaft in a manner to vary the amplitude of force transmitted to said ground engaging member, said vibrator means including variable speed drive means for selectively varying the rotational speed of said rotatable mass such that the amplitude and frequency of the force imparted to said ground engaging member is selectively variable to compensate for variations in ground conditions and maintain generally uniform movement of said ground engaging member with respect to the ground.

2. Apparatus as defined in claim 1 wherein said mass member is secured on said drive shaft, said drive shaft and said mass member defining at least one fluid pressure passage therein communicating with said fluid pressure chamber to allow the introduction of fluid pressure into said pressure chamber in a manner to overcome said biasing means and move said mass member toward a position of zero eccentricity relative to its axis of rotation.

3. Apparatus as defined in claim 1 wherein said variable speed drive means includes fluid motor means connected to said drive shaft and adapted to selectively vary the rotational speed of said mass member so as to vary the frequency of the force applied to said ground engaging member.

4. Apparatus as defined in claim 1 wherein said frame support means comprises a mounting plate adapted to be secured to a vehicle, said frame means further having a generally horizontally disposed platform portion, said ground engaging member being secured in depending relation from said horizontal portion of said frame means so as to extend downwardly substantially perpendicular to a ground surface preparatory to penetration thereof, and wherein said vibrator means is mounted on the upper surface of said horizontal portion of said frame support means.

5. Apparatus as defined in claim 1 wherein said frame support means includes first support plate means adapted to be mounted in a generally upright plane to a movable support means, shaft means, means on said first support plate means for receiving and supporting said shaft means in a substantially horizontal position, second support plate means mounted on said shaft means for pivotal movement of said second support plate means about an axis of said shaft means relative to said first support means, said second support plate means supporting said vibrator means, first resilient means interposed between said shaft means and said means on said first support plate means that receives and supports said shaft means, and second resilient means disposed between said first and second support plate means and biasing said second support plate means to a position substantially parallel to the plane of said first support plate means, whereby said second plate means is translatable with respect to said shaft means and is pivotally movable about the axis of said shaft means relative to said first support plate means.

6. Apparatus for use in imparting a cyclical vibratory motion to a ground engaging implement or the like, comprising, in combination, housing means defining a chamber therein, drive shaft means mounted on said housing means and extending into said chamber, said shaft means being rotatable about its longitudinal axis, mass means mounted on said shaft means within said chamber for rotation about the axis of said shaft means, said mass means being adjustable to vary the eccentricity of its center of mass relative to the axis of said shaft means between a position of zero eccentricity and a position of maximum eccentricity, biasing means operatively associated with said mass means and adapted to urge said mass means to a position of maximum eccentricity, fluid pressure control means operatively associated with said mass means and adapted to selectively vary the eccentricity of said mass means relative to said shaft means during rotation of said mass means, and means for selectively varying the rotational speed of said mass means about the axis of said shaft means whereby the amplitude and frequency of the force applied to said housing means by said rotating eccentric mass means may be selectively varied.

7. Apparatus as defined in claim 6 wherein said vibrator means includes a pair of said rotatable mass members supported for rotation about parallel spaced axes defined by support shafts upon which said rotatable mass members are secured, each of said mass members having means for varying the eccentricity of the center of mass thereof relative to its axis of rotation, said support shafts and said mass members being cooperative to establish a resultant generally vertical vibrational force upon rotation of said mass members.

* * * * *

UNITED STATES PATENT OFFICE
CERTIFICATE OF CORRECTION

Patent No. 3,948,329  Dated April 6, 1976

Inventor(s) Ernest W. Cummings

It is certified that error appears in the above-identified patent and that said Letters Patent are hereby corrected as shown below:

Col. 1, line 65, "frequecny" should be -- frequency --.

Col. 5, line 36, "peeripheral" should be -- peripheral --.

Col. 5, line 64 "diposed" should be -- disposed --.

Col. 7, line 14, "72" should be -- 172 --.

Col. 7, line 55, "105" should be -- 150 --.

Col. 7, line 66, "105" should be -- 150 --.

Signed and Sealed this

Thirty-first Day of August 1976

[SEAL]

Attest:

RUTH C. MASON  
*Attesting Officer*

C. MARSHALL DANN  
*Commissioner of Patents and Trademarks*